United States Patent [19]

Matsunaga

[11] Patent Number: 4,766,968

[45] Date of Patent: Aug. 30, 1988

[54] MOUNT FOR AUTOMOBILE RADIATOR

[75] Inventor: Yukihiro Matsunaga, Yokohama, Japan

[73] Assignee: Nissan Motor Co., Ltd., Japan

[21] Appl. No.: 840,750

[22] Filed: Mar. 18, 1986

[30] Foreign Application Priority Data

Mar. 20, 1985 [JP] Japan .............................. 60-41296[U]

[51] Int. Cl.$^4$ ...................... B60K 11/04; F16F 15/08
[52] U.S. Cl. ................... 180/68.4; 248/629; 248/213.3
[58] Field of Search ...................... 180/68.4, 68.6, 312; 248/629, 632, 634, 213.3, 609; 165/67; 267/140.5, 141

[56] References Cited

U.S. PATENT DOCUMENTS

| 1,929,201 | 10/1933 | Fröhlich | 248/629 |
| 2,751,147 | 6/1956 | Wurtz | 248/629 |

FOREIGN PATENT DOCUMENTS

| 878468 | 6/1953 | Fed. Rep. of Germany | 180/68.4 |
| 50-137725 | 11/1975 | Japan |
| 53-69924 | 6/1978 | Japan |
| 57-84223 | 5/1982 | Japan |

Primary Examiner—John J. Love
Assistant Examiner—Karin L. Ferriter
Attorney, Agent, or Firm—Leydig, Voit & Mayer

[57] ABSTRACT

According to the present invention, a pressure plate cooperates with a fixed portion of a vehicle body to clamp therebetween one end portion of an elastic body, and the elastic body has an opposite end portion received by a space defined by a first wall and a second wall which are fixed to a radiator to be resiliently attached to the vehicle body. The opposite end portion is clamped by the first and second walls. Disposed between the one end opposite end portions is a middle portion which is subject to a shearing stress during vibration of the radiator relative to the vehicle body. The middle portion is subject to a compressible load when the radiator is forced to move toward the fixed portion of the vehicle body.

19 Claims, 5 Drawing Sheets

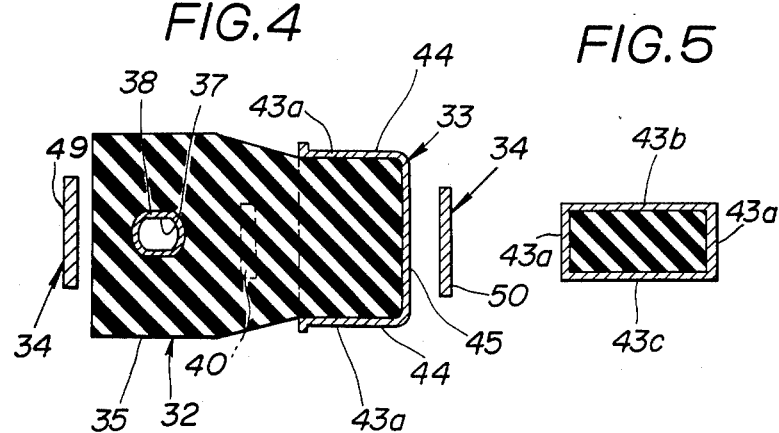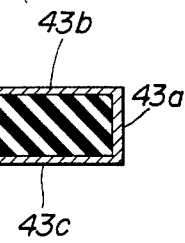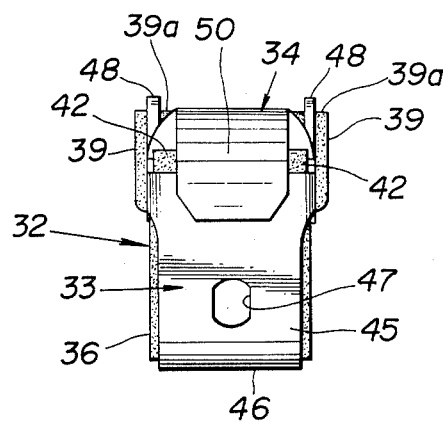

MOUNT FOR AUTOMOBILE RADIATOR

BACKGROUND OF THE INVENTION

1. Field of the Invention

The present invention relates to a mount for resiliently attaching a member to a fixed portion of a vehicle body of an automobile, and more particularly to a mount which may be used as an upper mount for resiliently attaching an upper portion of a radiator to a radiator core support fixed to a vehicle body of an automobile, the radiator having its lower portion resiliently mounted relative to the vehicle body, thus working as a mass of a dynamic damper for damping vibration of the vehicle body.

2. Prior Art

Japanese Patent Application provisional publication No. 57-84223 discloses a dynamic damper, employing a radiator as a mass, for damping vibration of a vehicle body of an automobile. According to this publication, the radiator is resiliently mounted such that the mass of the radiator works to damp vibration of the vehicle body. Referring to FIGS. 9 and 10, this known mounting arrangement is now described.

Referring to FIG. 9, a radiator 1 is disposed within an engine compartment 3 of a vehicle body 2 near the front end thereof. The radiator 1 has a lower portion resiliently supported on a first cross member 4 of the vehicle body 2 via elastic lower mounts 5. An upper portion of the radiator 1 is resiliently attached to a radiator core support 6 fixed to the vehicle body by upper mounts 7.

As shown in FIG. 10, each of the upper mounts 7 comprises an elastic body in the shape of a rectangular block 8, made of an elastic material such as a rubber. The block 8 has one end fixed to an attachment steel plate 9 formed with a pair of bolt receiving holes 9a and 9a, and an opposite end fixed to an attachment steel plate 10 having a bolt 11 fixedly embedded thereto. These attachment steel plates 9 and 10 are fixed to the block 8 by baking. The radiator core support 6 has a plurality of bolts 12 embedded thereto. The attachment plate 9 is fixed to the radiator core support 6 by inserting two of the bolts 12 into the corresponding holes 9a, 9a, respectively, and then tightening nuts (not shown) after threadedly engaging the bolts 12, 12. Two attachments 13 are fixed to the radiator 1 and extend upward above the upper portion thereof. The other attachment steel plate 10 of each of the upper mounts 7 is fixed to the corresponding one of the attachment 13 by engaging the bolt 11 in a cutout 14 formed in the attachment 13 and then tightening a nut (not shown) after threadedly engaging with the bolt 11.

Since the attachment steel plates 9 and 10 are baked to the block 8, the structure of this known mount 7 demands special care in anti-corrosion treatment, causing a delay in its manufacture.

Japanese Utility Model Application provisional publication No. 53-69924 or No. 50-137725 discloses a mount which uses an elastic body in the shape of a plate made of a rubber. The elastic body has one and opposite end portions formed with bolt receiving holes having two bolts passing therethrough. One bolt is fixed to a vehicle body and the other bolt is fixed to a member to be resiliently attached to the vehicle body.

What is taught by this known mount is to form bolt receiving holes through an elastic body at its end portions so as to fix the end portions thereof to a vehicle body and a member to be resiliently attached to the vehicle body. According to this teaching, there is provided a mount which does not require baking and thus is free from the problem mentioned with reference to the mount disclosed by Japanese Patent Application provisional publication No. 57-84223.

A task of the present invention is to improve a mount comprising an elastic body having one and opposite end portions fixed to a vehicle body and a member to be resiliently attached to the vehicle body such that it does not require baking in its assembly, and the elastic body is subject to a shearing stress during vibration of the member relative to the vehicle body and it does not buckle under a compressible load.

SUMMARY OF THE INVENTION

According to the present invention, a pressure plate cooperates with a fixed portion of a vehicle body to clamp therebetween one or a first end portion of an elastic body, and the elastic body has an opposite or second end portion received by a space defined by a first wall and a second wall which are fixed to a member to be resiliently attached to the vehicle body. The opposite end portion is clamped by the first and second walls. Disposed between the one and opposite end portions is a middle portion which is subject to a shearing stress during vibration of the member relative to the vehicle body. The middle portion is subject to a compressible load when the member is forced to move toward the fixed portion of the vehicle body.

An embodiment of a mount according to the present invention is used for resiliently attaching an upper portion of a radiator to a radiator core support fixed to a vehicle body. The mount comprises an elastic body having one end portion fixed to the radiator core support, and an opposite end portion fixed to an attachment secured to the upper portion of the radiator, a pressure plate cooperating with the radiator core support to clamp therebetween the one end portion of the elastic body, and a bracket cooperating with the attachment to have a first wall and a second wall. These walls are fixed to the radiator and arranged in parallel to define a space receiving therein the opposite end portion of the elastic body. The first and second walls clamp therebetween the opposite end portion of the elastic body.

Specifically, the one and opposite end portions of the elastic body define therebetween a middle trapezoidal portion. In order to prevent the opposite end portion of the elastic body from disengaging from the space defined between the first and second walls, the elastic body has a radial extension. The opposite end portion is connected to the radial extension at one end portion thereof, and the bracket includes a third wall which cooperate with the attachment to clamp therebetween the radial extension of the elastic body.

According to the one embodiment, the bracket has a hollow rectangular portion having the first and second walls.

According to another embodiment, the bracket has the first wall, and the attachment is formed with includes the second wall.

BRIEF DESCRIPTION OF THE DRAWINGS

FIG. 4 is a cross sectional view taken along the line IV—IV shown in FIG. 1 with a bolt removed;

FIG. 5 is a cross sectional view taken along the line V—V shown in FIG. 3;

FIG. 6 is a side elevational view as viewed in a direction as indicated by an arrow VI shown in FIG. 3;

DETAILED DESCRIPTION OF THE PREFERRED EMBODIMENTS

Figure 1:
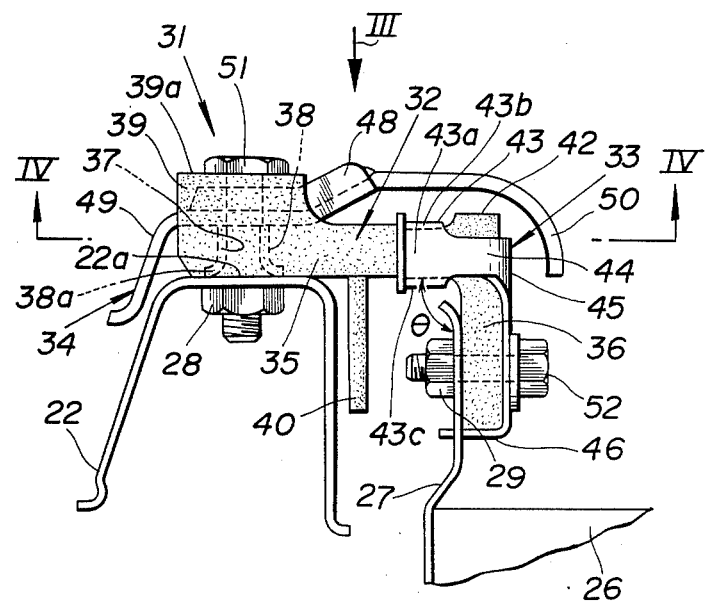
FIG. 1 is an enlarged fragmentary view of FIG. 7 and shows a first embodiment according to the present invention.

Referring to FIGS. 1 to 8, two preferred embodiments according to the present invention are hereinafter described wherein like reference numerals are used to designate like parts throughout all of the Figures.

Figure 7:
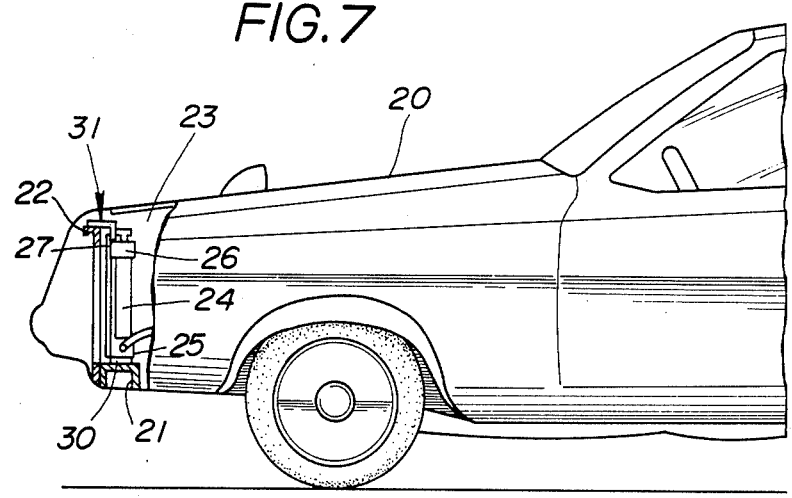
FIG. 7 is a side elevational view of a front portion of an automobile showing a dynamic damper using a radiator which has an upper portion resiliently attached to a radiator core support.

Referring first to FIG. 7, there is shown an automobile including a vehicle body 20. A cross member 21 and radiator core support 22 are fixed to the vehicle body within an engine compartment 23 near the front end thereof, with respect to the travelling direction of the automobile, in a known manner. A radiator 24 for an internal combustion engine (not shown) is mounted in such a known manner that the radiator 24 has a lower tank 25 and an upper tank 26. The lower tank 26 is resiliently held on the cross member 21 by means of a plurality of known elastic lower mounts as designated by 30, while the upper tank 26 has an attachment 27 fixed thereto and is resiliently attached to the radiator core support 22 by means of a plurality of upper mounts as designated by 31.

Figure 2:
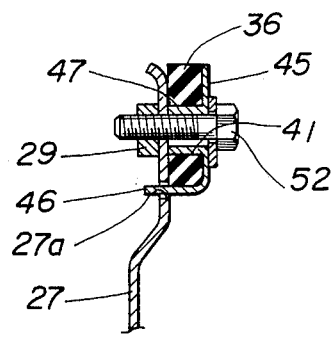
FIG. 2 is a fragmentary view of FIG. 1 sectioned to show the detail.

Referring to FIG. 1, there is shown the detail how in upper tank 26 of the radiator 24 is resiliently attached to the radiator core support 22. A nut 28 is welded to the radiator core support 22 at the back of a top flat portion 22a of the radiator core support 22, while a nut 29 is welded to the attachment 27 on a forward facing side thereof with respect to the travelling direction of the automobile thereof. As best seen in FIG. 2, the attachment 27 is formed with a slot 27a within an area disposed below an area where the nut 29 is welded.

Figure 3:
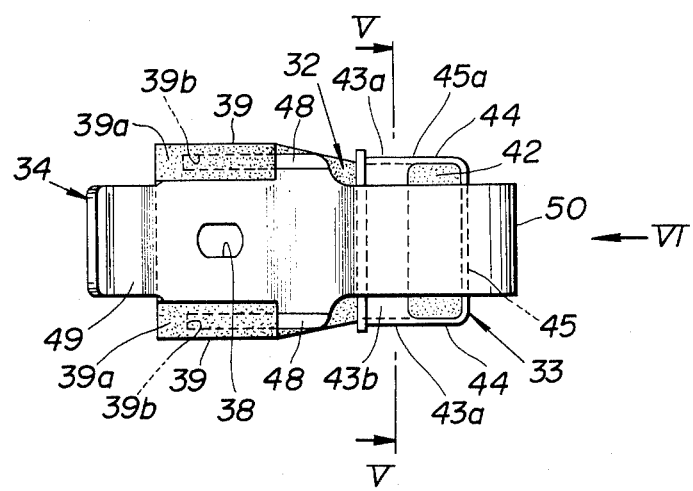
FIG. 3 is a plan view as view as viewed in a direction as indicated by an arrow III shown in FIG. 1 showing an assembly of an elastic body with a pressure plate and a bracket without a nut and bolt.

Referring back to FIG. 1, the mount 31 comprises an elastic body 32 of an elastic material such as a rubber, a bracket 33, and a pressure plate 34. In this embodiment, the bracket 33 and pressure plate 34 are formed of a steel and are subject to anti-corrosion treatment before they are assembled with the elastic body 32 as shown in FIG. 3. As will be understood from the later description with reference to FIGS. 1 to 6, the elastic body has one end portion detachably engaged with the pressure plate 34 and an opposite end portion detachably engaged with the bracket 33.

As best seen in FIG. 1, the elastic body 32 has at one end a portion formed with a bolt receiving hole 37 having fit therein a bushing 38 integral with a flange 38a as shown by the broken line. As best seen in FIG. 3, the bushing 38 is elongate in a longitudinal direction of the vehicle body 20 for ease of adjustment. As best seen in FIG. 4, the one end portion of the elastic body 32 is connected to the opposite end portion via a middle trapezoid portion so as to form a longitudinally extending main structure 35. The one end portion is formed with two parallel side walls 39, 39 extending from the two parallel side lines thereof (See FIGS. 1, 3 and 6). The side walls 39, 39 have their upper end portions 39a, 39a extending toward each other. The top end portions 39a, 39a are formed with grooves 39b, 39b (see FIG. 3) for receiving therein two parallel side walls 48, 48 of the pressure plate 34.

Referring to FIGS. 1, 3, and 5, the opposite end portion of the elastic body 32 is received in a space defined by two parallel walls a first wall 43b and a second wall 43c of a hollow rectangular portion 43 of the bracket 33 and clamped by these walls 43b and 43c. These two walls 43b and 43c are interconnected by another two parallel walls 43a, 43a to form the hollow rectangular portion 43 of the bracket 33. In order to prevent disengagement of the elastic body 32 from the space defined between the two parallel walls 43b and 43c, the elastic body 32 has a radial downward extension 36 extending in a downward direction of the main structure 35 with respect to the longitudinal direction. The opposite end portion of the longitudinally extending main structure 35 is connected to the downwardly depending extension 36 at one end portion thereof. The downward extension 36 is formed with a bolt receiving hole 41 at an opposite end portion thereof (see FIG. 2). As will be readily understood from FIGS. 2 and 6, the bolt receiving hole 41 is elongate in the longitudinal direction of the radial extension 36 for ease of adjustment. As best seen in FIGS. 1 and 6, the downward extension 36 has an upper end 42 projecting above the level of the wall 43b of the hollow rectangular portion 43. The extension 36 passes through a space defined between two parallel side walls 44 extending from the two side walls 43a, 42a of the hollow rectangular portion 43 and attached to an arm or arm plate 45 connected to the two side walls 44 and extending downwards as viewed in FIGS. 1 and 6. The arm plate 45 has an integral bushing 47 inserted into the hole 41 formed through the extension 36 (see FIG. 2). The arm plate 45 has its lower end curved inwardly to form a motion limiting plate 46. The hollow rectangular portion 43, two parallel side walls 44, 44, arm plate 45, and motion limiting plate 46 form the bracket 33 in the shape of a generally L as viewed in FIG. 1.

As best seen in FIG. 1, the pressure plate 34 has a forward extension 49 curved downwards as viewed in FIG. 1 to protect the one end portion of the elastic body 32 and a rearward extension 50 positioned above the longitudinally extending main structure 35 of the elastic body 32 and curved downwards at its end in a manner as illustrated in FIGS. 1 and 6

As will be readily understood from the foregoing description, the pressure plate 34 and bracket 33 are assembled with the elastic body 32 without baking before mounting between the radiator core support 22 and the attachment 27.

The assembly described above is mounted in such a manner that the pressure plate 34 is fixed securely to the flat portion 22a of the radiator core support 22 by means of a bolt 51 and the nut 28 to securely clamping therebetween the one end portion of the elastic body 32 and the arm 45 is fixed securely to the attachment 27 by means of a bolt 52 and the nut 29 after inserting the motion limiting plate 46 into the slot 27a formed through the attachment 27 (see FIG. 2). The bolt 52 is tightened to securely clamp the downward extension 36 between the arm 45 and the attachment 27. Thus, the opposite end portion of the longitudinally extending main structure 35 of the elastic body 32 clamped between the two parallel walls 43b and 43c of the hollow rectangular portion 43 is kept securely clamped therein during operation of the automobile The elastic body 32 has a plate 40 extending downwardly from the middle trapezoid portion of the longitudinally extending main structure 35 thereof, as viewed in FIG. 1. The plate 40 is positioned between the radiator core support 22 and the attachment 27 to prevent the bolt 52 from colliding with the radiator core support 22. The projecting upper end 42 of the extension 36 is proceeded to come into abutting engagement with the rearward extension 50 of the pressure plate 34 to limit excessive upward displacement of the radiator 24 having the upper tank 26 relative to the radiator core support 22.

The operation of the mount 31 is hereinafter described.

When low frequency vibration is applied to the vehicle body 20, the longitudinally extending main structure 35 of the elastic body 32 is subject to a shearing stress at the middle trapezoid portion thereof during vertical vibration of the radiator 24 relative to the radiator core support 22 and the cross member 21 which are fixed to the vehicle body 20. Owing to the inertia of the radiator 24, the vibration from the vehicle body 20 is damped. The reason why longitudinally extending main structure 35 is subject to the shearing stress only is that an angle $\theta$ (theta) through which the opposite end portion of the longitudinally extending main structure 35 joins the extension 36 is prevented from varying by means of the bracket 33 having the opposite end portion of the longitudinally extending main structure 35 clamped between the two parallel walls 43b and 43c and the radial extension 36 clamped between the arm 45 and the attachment 27.

Since the longitudinally extending main structure 35 of the elastic body 32 is flexed under shearing stress only at the middle trapezoid portion, the mount 31 shows a linear flexure-load characteristic which is required as an upper mount for a dynamic damper using a radiator as a mass thereof.

Although, in the above embodiment, the opposite end portion of the longitudinally extending main structure 35 of the elastic body 32 is clamped by the two walls 43b and 43c of the bracket 33, the manner of clamping the opposite end portion is not limited to this example. Another example is described with reference to FIG. 8.

Figure 8:
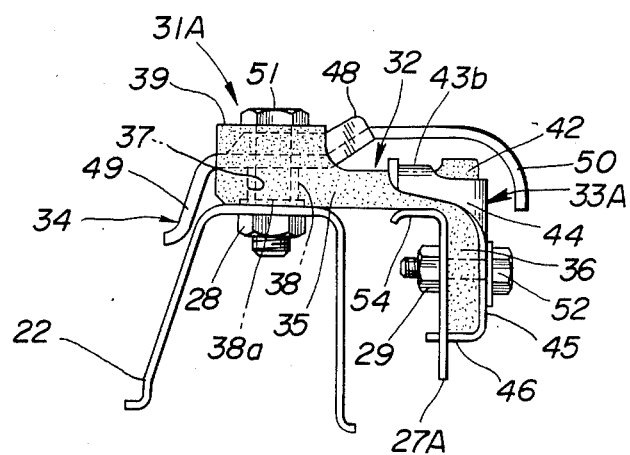
FIG. 8 is a similar view to FIG. 1 showing a second embodiment according to the present invention.
Figure 9:
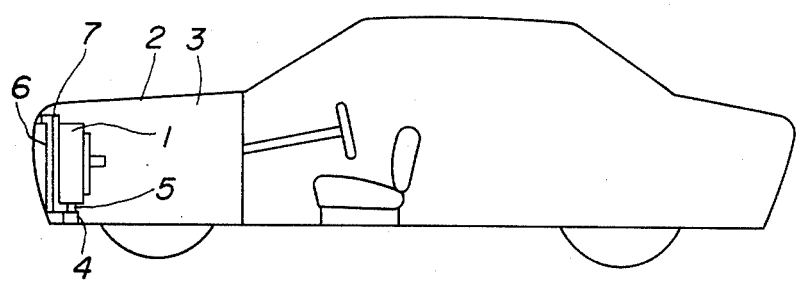
FIG. 9 is a schematic view of an automobile installed with a dynamic damper using a radiator as a mass according to the prior art.
Figure 10:
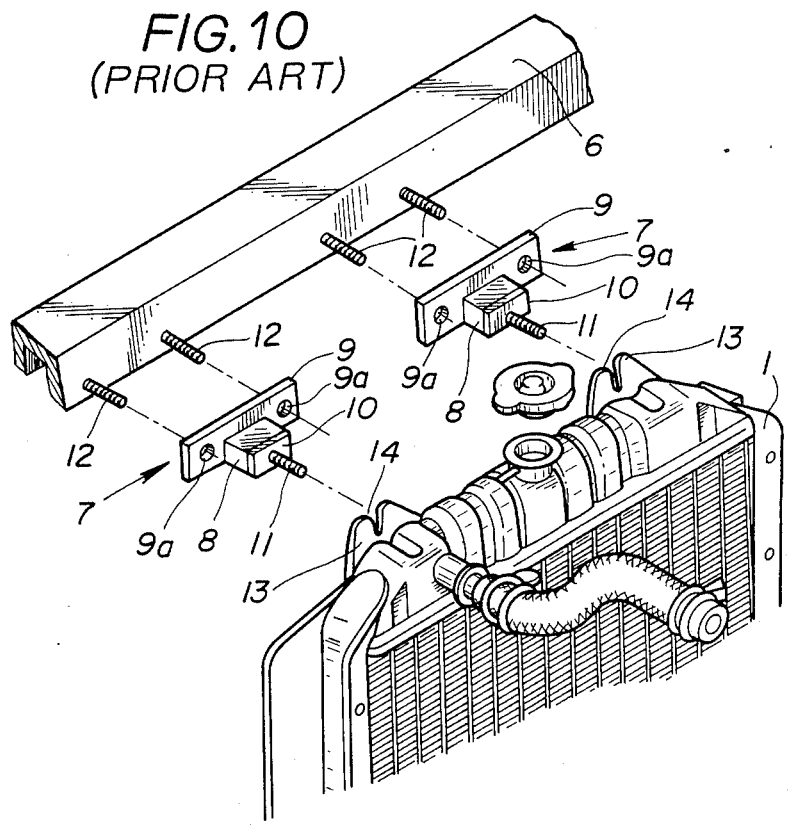
FIG. 10 is an exploded view of a mounting arrangement for resiliently attaching an upper portion of the radiator to a radiator core support shown in FIG. 9.

Referring to FIG. 8, a mount 31A is substantially the same as the mount 31 described previously with reference to FIGS. 1 to 7 except the provision of a bracket 33A and an attachment 27A which are slightly different from their counterparts 33 and 27, respectively, shown in FIG. 1. The bracket 33A is different from the bracket 33 in that it is not formed with the wall 43c, while the attachment 27A is different from the attachment 27 in that is has a second wall 54 extending in parallel to a first wall 43b of the bracket 33A. In this embodiment, the wall 43b of the bracket 33A cooperates with the wall 54 of the attachment 27A to clamp therebetween an opposite end portion of a longitudinally extending main structure 35 of an elastic body 32.

As will now be appreciated, the present invention has provided a mount which is easy to manufacture because the elastic body 32 has the shape easily formed from a plate rubber, and the pressure plate 34, bracket 33 or 33A, and elastic body 32 are assembled easily without using baking.

Because the one and opposite end portions of the longitudinally extending main structure 35 of the elastic body 32 are clamped with the middle trapezoid portion left unclamped, the middle trapezoid portion serves as an elastic block strong enough to withstand compressible load which would be applied if the vehicle body 20 encounters head-on collision and thus will not buckle. Thus, the radiator 24 is prevented from colliding with the radiator core support 22 during the head-on collision of the vehicle 20.

Because baking is not employed, anti-corrosion treatment for the pressure plate 34 and the bracket 33 or 33A may be selected from any anti-corrosion treating processes.

Because the pressure plate 34, elastic body 32, and bracket 33 or 33A are easily assembled without baking and easily disengaged from each other, the operating life of each of them can be elongated independently.

I claim:

1. A mount for resiliently attaching a member to a fixed portion of a vehicle body, comprising:
   an elastic body having a first end portion, an opposite second end portion, and an elongated middle portion;
   first means for fixing said first end portion of said elastic body to the fixed portion of the vehicle body;
   second means for fixing said opposite second end portion of said elastic body to the member;
   said first fixing means including a pressure plate cooperating with the fixed portion to clamp therebetween said one end portion of said elastic body;
   said second fixing means including a first wall and a second wall which cooperate with each other to clamp therebetween said opposite second end portion of said elastic body, said second fixing means further including an attachment fixed to the member and a bracket having an arm and a hollow rectangular portion integral with said arm, said hollow retangular portion including said first and second walls, said arm being fixed to said attachment.

2. A mount as claimed in claim 1 wherein said elastic body includes a longitudinally extending main structure having said first end portion and said second opposite end portion, and an extension, said opposite end portion of said longitudinally extending main structure being connected to said 3. A mount as claimed in claim 2, wherein said longitudinaly extending main structure includes means for defining a plurality of grooves, and said pressure plate includes a plurality of side walls slidably received by said plurality of grooves.

4. A mount as claimed in claim 2 wherein said longitudinally extending main structure and said extension are maintained with respect to one another at a substantially invarying angle by the arm and the hollow rectangular portion of said bracket.

5. A mount as claimed in claim 2 wherein said extension extends downwardly.

6. A mount as claimed in claim 5 wherein said extension includes an upper end projecting toward said pressure plate.

7. A mount as claimed in claim 1 wherein said walls are parallel.

8. A mount as claimed in claim 1 wherein said elastic body has a plate extending downwardly from the elongated middle portion.

9. A mount as claimed in claim 1 wherein said elongated middle portion has a trapezoidal configuration.

10. In an automobile having a vehicle body with an engine compartment, a cross member fixed within the vehicle body, a radiator core support fixed within the vehicle body, and a radiator having a lower portion resiliently disposed on the cross member and an upper portion, a mount for resiliently attaching the upper portion of said radiator to the radiator core support, comprising:

an elastic body having a first end portion, an opposite second end portion, and an elongated middle portion;

first means for fixing the first end portion of the elastic body to the radiator core support;

second means for fixing the opposite second end portion of the elastic body to the upper portion of the radiator;

said first fixing means including a pressure plate cooperating with the radiator core support to clamp therebetween said one end portion of said elastic body;

said second fixing means including a first wall and a second wall which cooperate with each other to clamp therebetween said opposite second end portion of said elastic body, said second fixing means further including an attachment fixed to the upper portion of the radiator and a bracket having an arm and a hollow rectangular portion integral with said arm, said hollow rectangular portion including said first and second walls, said arm being fixed to said attachment.

11. A mount as claimed in claim 10 wherein said elongated middle portion has a trapezoidal configuration.

12. A mount for resiliently attaching a member to a fixed portion of a vehicle body, comprising;

an elastic body having a first end portion, an opposite second end portion, and an elongated middle portion;

first means for fixing said first end portion of said elastic body to the fixed portion of the vehicle body;

second means for fixing said opposite second end portion of said elastic body to the member;

said first fixing means including a pressure plate cooperating with the fixed portion to clamp therebetween said one end portion of said elastic body;

said second fixing means including a first wall and a second wall which cooperate with each other to clamp therebetween said opposite second end portion of said elastic body, said fixing means further including an attachment fixed to the member and a bracket having an arm integral with said first wall, said attachment including said second wall, said arm being fixed to said attachment, and said elastic body including a longitudinally extending main structure having said one first end portion and said opposite second end portion, and an extension, said opposite second end portion of said longitudinally extending main structure being connected to said extension, and said extension being clamped between said attachment of said arm of said bracket.

13. A mount as claimed in claim 12, wherein said longitudinally extending main structure includes means for defining a plurality of grooves, and said pressure plate includes a plurality of side walls slidably received by said plurality of grooves.

14. A mount as claimed in claim 12 wherein said walls are parallel.

15. A mount as claimed in claim 4 wherein said longitudinally extending structure and said extension are maintained with respect to one another at a substantially invarying angle by the arm and said first wall of said bracket and the second wall of said attachment.

16. A mount as claimed in claim 12 wherein said extension extends downwardly.

17. A mount as claimed in claim 16 wherein said extension includes an upper end projecting toward said pressure plate.

18. A mount as claimed in claim 12 wherein said elastic body includes an extension connected to said opposite second end portion of said elastic body, said extension being clamped between said attachment and said arm of said bracket.

19. A mount as claimed in claim 12 wherein at least a portion of said attachment is fixed to said arm and said second wall and the portion of said attachment fixed to said arm are disposed at an angle to one another.

* * * * *